United States Patent [19]

Rambosek

[11] Patent Number: 4,707,399
[45] Date of Patent: Nov. 17, 1987

[54] BICOMPONENT CERAMIC FIBERS

[75] Inventor: George M. Rambosek, Woodbury, Minn.

[73] Assignee: Minnesota Mining and Manufacturing Company, St. Paul, Minn.

[21] Appl. No.: 809,065

[22] Filed: Dec. 13, 1985

[51] Int. Cl.[4] .................. B32B 9/00; D02G 3/00; D03D 3/00

[52] U.S. Cl. .................. 428/225; 139/420 R; 139/425 R; 428/224; 428/292; 428/370; 428/374; 428/379; 428/384; 428/397

[58] Field of Search .................. 501/95, 103; 428/373, 428/374, 370, 375, 379, 384, 224, 225, 292, 397, 364; 139/420 R, 425 R; 106/57

[56] References Cited

U.S. PATENT DOCUMENTS

| | | | |
|---|---|---|---|
| 2,313,296 | 3/1943 | Lamesch | 49/92 |
| 2,968,622 | 1/1961 | Whitehurst | 501/95 X |
| 3,311,689 | 3/1967 | Kelsey | 501/95 X |
| 3,385,915 | 5/1968 | Hamling | 501/95 X |
| 3,632,709 | 1/1972 | Hayes et al. | 501/95 X |
| 3,652,749 | 3/1972 | Sobel et al. | 501/95 X |
| 3,663,182 | 5/1972 | Hamling | 23/355 |
| 3,760,049 | 9/1973 | Borer et al. | 501/95 X |
| 3,793,041 | 2/1974 | Sowman | 106/57 |
| 3,795,524 | 3/1974 | Sowman | 501/95 |
| 3,909,278 | 9/1975 | Johnson | 501/95 |
| 3,950,478 | 4/1976 | Kenworthy et al. | 501/95 X |
| 4,047,965 | 9/1977 | Karst et al. | 501/95 |
| 4,071,594 | 1/1978 | Pearson et al. | 501/95 X |
| 4,118,534 | 10/1978 | Stanley | 428/370 |
| 4,125,406 | 11/1978 | Sowman | 501/95 X |
| 4,166,147 | 8/1979 | Lange | 501/95 X |
| 4,278,634 | 7/1981 | Zwick | 264/168 |
| 4,287,254 | 9/1981 | Dobo | 428/384 X |

FOREIGN PATENT DOCUMENTS 7015245 10/1970 Netherlands .
1287288 12/1968 United Kingdom .

OTHER PUBLICATIONS

"Modern Composite Materials", chapter 8, edited by Brautman and Krock, published by Addison-Wesley Pub. Co.

Primary Examiner—Lorraine T. Kendell
Attorney, Agent, or Firm—Donald M. Sell; James A. Smith; Lorraine R. Sherman

[57] ABSTRACT

A continuous, bicomponent, non-vitreous ceramic fiber comprises components existing in a longitudinal side by side relationship wherein each of the components is derived from a different fiber-forming precursor liquid. Firing the bicomponent fibers in a reducing atmosphere can provide ceramic/cermet or cermet/cermet fibers wherein each cermet component has a graded composition.

19 Claims, 5 Drawing Figures

BICOMPONENT CERAMIC FIBERS

FIELD OF THE INVENTION

This invention relates to bicomponent, non-vitreous ceramic fibers wherein the component fibers are in a continuous, longitudinally extending, side-by-side configuration. In another aspect, it relates to a process for preparing bicomponent ceramic fibers from two distinct precursor liquids. In a further aspect, the bicomponent ceramic fibers can be converted to cermet/cermet or ceramic/cermet fibers.

BACKGROUND ART

Within the last decade, an amount of literature has been published describing various polycrystalline, microcrystalline, or non-vitreous fibers and other shaped articles of refractory metal oxides. These articles are made by various non-melt processes, such as by drying films of solutions of metal oxide precursors or oxide sols, or drying organic polymeric bodies, such as cellulose or rayon, impregnated with such a solution, or by extruding and drawing, or spinning, viscous fluids of such metal compounds into fibers. The fibers are then heated to remove water, organic material, and other volatile material to produce a refractory article. A review of the state of the art of polycrystalline inorganic fibers appears in Chapter 8 of "Modern Composite Materials" edited by Broutman and Krock, published by Addison-Wesley Pub. Co., Reading, Mass. (1967). Other art in this area is Netherlands Pat. No. 7,015,245, British Pat. No. 1,287,288, U.S. Pat. Nos. 3,385,915, 3,632,709, 3,663,182 and the art cited in U.S. Pat. No. 3,709,706. Oxide fibers other than those identified as fiberglass are still in the relatively early stage of development. In many technologies, there is a need for a relatively inexpensive continuous refractory fiber product with desirable physical properties, such as high strength, high modulus of elasticity, chemical resistance, and the retention of such properties after exposure to high temperatures beyond the capability of presently commercially available fiber materials.

Bicomponent fibers are known in the textile art. Typical bicomponent polymer textiles are disclosed in U.S. Pat. Nos. 4,118,534 and 4,278,634. Generally, polymer bicomponent systems relate to two polymers of the same class, e.g., two polyester polymers, or two acrylonitrile polymers. Usually different polymers in a bicomponent system will split after spinning.

Blown-microfibers (3 to 5 micrometer diameter) comprising bicomponent systems, i.e, polyester-polypropylene have been disclosed in U.S. Ser. Nos. 704,537 and 540,544. Blowing such fibers requires use of a Naval Research Laboratories dual feed die.

U.S. Pat. No. 2,313,296 teaches concentrically disposed fibers or filaments of glass. These fibers do not crimp.

It is well-known in the art to prepare monocomponent ceramic fibers from spinning sols. For example, alumina-silica fibers are disclosed in U.S. Pat. No. 4,047,965; alumina-boria-silica fibers are taught in U.S. Pat. No. 3,795,524; titanium dioxide fibers are disclosed in U.S. Pat. No. 4,166,147; zirconia-silica fibers are disclosed in U.S. Pat. No. 3,709,706.

SUMMARY OF THE INVENTION

Briefly, the present invention provides a continuous, bicomponent, non-vitreous ceramic fiber wherein the components exist in a longitudinal side-by-side relationship and each of the components is derived from a different fiber-forming precursor liquid.

In another aspect, a spinning process is provided for forming a bicomponent ceramic fiber wherein two fiber-forming ceramic liquid precursor systems of different composition are extruded together through the same spinnerette orifices to form a single continuous fiber comprising two conjugate, contiguous ceramic phases in the length of the spun fiber.

The continuous two phase fiber of the present invention preferably comprises a first phase having a different composition from a second phase. The two components (two phases) are contiguous in a side by side array to form a single ceramic fiber or filament. The present invention can provide a high strength carrier component for a low strength component of special characteristics, for example, magnetic or catalytic components.

The ceramic bicomponent fibers of the present invention are made by a non-melt process comprising shaping viscous concentrates of two precursor liquids into a fiber form and then dehydratively or evaporatively gelling or hydrolyzing the drawn or spun fibers. These fibers can subsequently be dried to result in a "green" or non-refractory amorphous fiber. Heating and firing the shaped green fiber removes water, decomposes and volatilizes undesired fugitive constituents, and converts it into the refractory fiber of the invention.

In this application:

"ceramic" means inorganic nonmetallic material consolidated by the action of heat, such as metal and non-metal oxides, carbides, nitrides, sulfides, etc.

"cermet" means a mixture of ceramic and metallic materials;

"sol" means a fluid solution or a colloidal suspension;

"bicomponent fiber" means physically joining together along the length of the fibers two components derived from compatible precursor liquids of different compositions convertible to ceramic materials;

"non-vitreous" means not formed from a melt;

"polycrystalline" means a phase which gives a discernible X-ray powder diffraction pattern. Crystallite size will affect the line width of the X-ray diffraction pattern. The smaller the crystallite size (below approximately 1 micrometer), the broader the lines will become. This affects the resolution of the X-ray pattern fine features such as lines of weak intensity or the ability to separate closely-spaced lines may be lost. An overall pattern remains however and is indicative of the crystal structure;

"microcrystalline" means a crystalline phase having a crystallite or grain size of about 50 Å to 1000 Å ($5 \times 10^{-9}$ to $1 \times 10^{-7}$ m) and sometimes larger, but always less than 10,000 Å ($1 \times 10^{-6}$ m). Such a microscrystalline structure may be transparent, providing the material itself is not opaque or contains opaque fillers, large pores, gross areas of inhomogeneity, and the like. Many microscrystalline ceramics are transparent or translucent;

"amorphous" means a material having a diffuse X-ray diffraction pattern without definite lines to indicate the presence of a crystalline component;

"dehydrative gelling" or "evaporative gelling", mean that sufficient water and volatile material are removed from the shaped green fibers so that the form or shape of the fiber is sufficiently rigid to permit handling or processing without significant loss or distortion of the desired fibrous form or shape. Therefore, all the water in the shaped fiber need not be removed. Thus, in a sense, this step can be called partial dehydrative gelling. The shaped fibers in their green form are generally transparent to visible light and clear (or perhaps slightly hazy) under an optical microscope.

"green" refers to the ceramic articles which are unfired, that is, not in their ceramic form;

"phase" means a component that exists as distinct and separate portions distributed throughout a heterogeneous system;

"compatible" means the precursor liquid comprises at least partially miscible components; and "essentially identical" means less than 1 weight percent deviation in any component.

DETAILED DESCRIPTION

Figure 1:
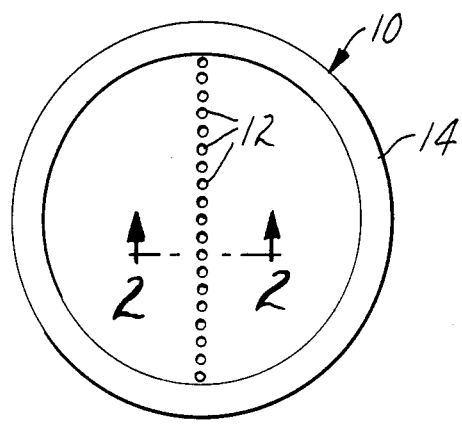
FIG. 1 shows a top plan view of a spinerette that can be used to spin bicomponent fibers in the present invention.

The ceramic bicomponent fiber of the present invention can be self-crimping. By controlling the ceramic compositions of the precursor liquids of the two refractory components the degree of crimping may be varied from a minimal amount to a large amount to provide a high loft curly fibrous mat. Selection of the sol compositions for final differential densification/shrinkage during the firing process controls the amount of crimping.

Preferably the components of the bicomponent fiber are non-vitreous ceramics of different compositions. However, it is envisioned within the scope of the present invention that the bicomponent fiber can comprise two components of identical final ceramic compositions which were derived from different precursor concentrations. For example, the components of the extruded fiber (green) can be (1) a first component derived from a first fiberizing batch containing 35 weight percent equivalent oxide, and (2) a second component derived from a second fiberizing batch containing 25 weight percent equivalent oxide. The difference in weight percent equivalent oxide is made up by fugitive organic materials. Upon firing, these organic materials will be differentially removed, resulting in greater shrinkage of one component to give a crimped fiber. In this case, the two components of the final bicomponent fiber have essentially identical ceramic compositions.

Components of the bicomponent fiber are used to produce refractory fibers known in the art. Bicomponent fibers can be made from precursor liquids such as from zirconia, silica, alumina, titania, chromia, and thoria, as individual sols, or in combination, for example, as alumina-boria-silica, as well as comprising precursor liquids with additives such as copper, iron, manganese, tin, cobalt, calcium, nickel, tungsten, molybdenum, platinum, and magnetic precursors such as barium titanate.

Preparation of aqueous liquid mixtures, sols, or dispersible colloids or mixtures thereof for individual components of the bicomponent fibers of the invention are disclosed, for example follows:

| Fiber | U.S. Pat. Nos. |
|---|---|
| titania | 4,166,147 |
| alumina-chromia-metal(IV) oxide | 4,125,406 |
| alumina-silica | 4,047,965 |
| thoria-silica metal(III) oxide | 3,909,278 |
| aluminum borate and aluminum borosilicate | 3,795,524 |
| zirconia-silica | 3,793,041 |
|  | 3,709,706 |

In one embodiment, the starting material used to prepare the refractory fibers of this invention can be prepared where, for example, one component comprises an alumina-silica precursor liquid. An aqueous silica sol is admixed with a compatible aqueous solution or dispersion of an aluminum compound and, where used, other oxide precursors, such as the boron and phosphorous compounds, to obtain a uniform dispersion without formation of a gel. Generally, this dispersion will be clear though sometimes it may be hazy. The pH of the dispersion will be inherently on the acid side, e.g., below 6, and is preferably 3 to 5. If desired, a compatible heat fugitive acid, such as acetic or nitric acid, can be added to the silica sol to acidify the same prior to use and prevent premature gelling. Compatible heat fugitive organic agents can be incorporated as adjuvants in the fiber starting material to improve shelf-life of the subsequently concentrated dispersion or to improve the fiberizing nature of the latter. Such organic agents representatively include polyvinylpyrrolidone, polyvinyl alcohol, lactic acid, dextrose/glucose (e.g. corn syrup), and mixtures thereof, these additives being oxidized and removed during the firing of the green fibers produced from such systems.

The aqueous solutions or disperions (precursor liquids) which are used to make the refractory fibers of this invention optionally can also contain various other water-soluble metal compounds (calcinable to metal oxide) which will impart additional desired properties to the refractory fibers. For example, an optional compound can be used to reduce weight loss, adjust refractive index or dielectric properties, or to impart, without sacrifice of clarity, internal color to the final refractory upon being converted or oxidized to the corresponding metal oxide. Thus, for alumina-silica, $Cr_2O_3$ can be used together with $P_2O_5$ to minimize weight loss otherwise resulting from the latter. Ferric nitrate can be added to impart an orange to gold color, chromium formate, acetate, or trioxide to impart to the fibers a green color, cobalt acetate or nitrate to impart a blue or lavender color, vanadyl sulfate to impart a yellow color, nickel acetate to impart a light green to blue color, and manganese nitrate or acetate to impart a tan to brown color. (Such colored refractory fibers, which can be mono- or bi-colored, are useful for color coding refractory articles). The ferric oxide-containing refractory can be reduced in a hydrogen atmosphere, the resulting reduced iron oxide or iron imparting a black color to the refractory and making it attractive to a magnet but not electrically conductive. Other optional compounds are the water soluble nitrates, formates, acetates, citrates, lactates, tartrates, or oxalates of lithium, sodium, potassium, magnesium, calcium, strontium, barium, yttrium, titanium, zirconium, chromium, manganese, iron, cobalt, nickel, copper, zinc, tin, antimony, lanthanum, and vanadium as vanadyl sulfate.

The amount of such other optional metal oxide in the refractory component can vary, depending upon the property effect desired, e.g., the tone of the color or hue desired, but generally will be an amount in the range of as low as 0.05 to 0.5 to as much as 25 weight percent or more, based on the total weight of the component in the refractory fiber. Some fiber systems can accommodate these higher amounts of metal compounds, e.g., the alumina-boria-silica system. The larger amounts of optional metal oxide additive may cause the fibers to become friable or give rise to contamination problems when the fibers are used in a particular environment. Where these other metal oxides are to be used in alumina-silica fibers having a boria component derived from boric acid, the precursors of the other metal oxides should be other than chlorides if they are used in significant amounts since the combination of boric acid and high chloride levels (which can be determined empirically) in the starting material generally results in frangible fibers.

Those fibers comprising reducible metal oxides can be further fired in a reducing atmosphere, preferably hydrogen, to provide a cermet/cermet fiber or a ceramic/cermet fiber wherein the cermet component is of graded composition. The cermet component has a graded ceramic/metal content, the metal component decreasing from the periphery towards the center of the fiber component with predominant amount of the metal on the surface, the metal being in the form of discrete, nodular, preferably spheroidal metal particles which can protrude from the surface of the component and are separated from each other so as to provide an electrically nonconductive cermet. A "graded cermet component" means one in which the ratio of ceramic/metal is controlled and varied over the thickness of the component; such a cermet may exhibit a graded or gradual change from less than 100 weight percent metal content, preferably in the range of 10 to 95 weight percent metal content, on the outer surfaces (those surfaces in contact with the reducing atmosphere) to 0 weight percent metal content on the innermost portions of the component.

Each of the fiber precursor materials, as initially prepared, will be a relatively dilute liquid, generally containing about 10 to 30 weight percent equivalent oxide, carbide, or nitride solids or combinations thereof, which can be calculated from a knowledge of the equivalent solids in the raw materials and the amounts thereof used, or determined by calcining samples of the raw materials or component starting material. For the preparation of fibers, it is necessary to concentrate or viscosify the dilute liquid in order to convert it to a viscous or syrupy fluid concentrate which will readily gel when the concentrate is fiberized and dehydrated, for example when the concentrate is extruded and drawn in air to form fibers. The concentration step can be carried out by techniques known in the art, e.g., see said U.S. Pat. No. 3,795,524. Sufficient concentration will be obtained when the equivalent solids content is generally in the range of 25 to 55 (as determined by calcining a sample of the concentrate), and viscosities (Brookfield at ambient room temperature) are in the range of 10,000 to 1,000,000 cps preferably 40,000 to 100,000 cps, depending on the type of fiberizing or dehydrative gelling technique and apparatus used and the desired shape of gelled fiber. High viscosities tend to result in fibers which are circular in cross-section whereas low viscosities (e.g., less than 50,000 cps) tend to result in fibers which are oval or rod-like (elongated ovoid) in cross-section.

In the process for preparing the bicomponent fibers two spinning precursor liquids, which can be aqueous or organic solutions/sols, or mixtures thereof, are separately prepared as is known in the art. After concentration to viscous, fiberizable concentrates, the separate precursor liquids are spun together through the same orifice of a spinnerette assembly. The continuous fibers are spun from the dies, which can have about 1 to 21 orifices per centimeter, into a drying tower from which they are collected and fired. The process is well described above and in U.S. Pat. No. 3,760,049. The orifices of the apparatus are in a row of side-by-side configuration. To insure the streamline flow of the viscous sol into a bicomponent feed to the orifice, the feed cavity of the die can be optionally fitted with a baffle plate. In a preferred embodiment, no baffle plate is used. In conducting the spinning, the individual sols, solutions, or mixture thereof, of essentially equivalent rheological properties, particularly viscosity, are pressured in laminar flow and comingle with only interface mixing at the entrance of the orifice in such a manner as to unite into a single fiber of essentially equal volume proportions. In the alternative, bicomponent fibers can be prepared by a method described in U.S. Pat. No. 4,101,615 in which the green fibers are spun from fiberizable organic solutions, followed by hydrolysis, and subsequent calcination to the ceramic form.

In forming these side-by-side, continuous, bicomponent fibers, it is preferable to provide essentially equal proportions of the two precursor liquids making up the fiber components. Some degree of variation may be made by adjustments in viscosities which affects the flow rate of the laminar flow sols, or proper orifice entry design adjustments in flow can be made by pressure. It is generally preferred for making side-by-side bicomponent ceramic fibers that the spinning liquids entering the orifice should be in essentially a 50:50 volume ratio, preferably 40:60, although a broad range of compositions, for example, 10:90 can be useful.

In making continuous fibers, the viscous concentrates can be extruded through a plurality of orifices (e.g., total of 10 to 400) from a stationary head and the resulting green fibers allowed to fall in air by the force of gravity or drawn mechanically in air by means of drawing rolls or a drum or winding device rotating at a speed faster than the rate of extrusion. The concentrate can also be extruded through orifices from a stationary or rotating head and at the orifice exit blown by parallel, oblique or tangential streams of air, such as in the making of cotton candy, the resulting blown green fibers being in staple form or short form with lengths generally 25 cm or less (rather than filament form) and collected on a screen or the like in the form of a mat. Any of these forces exerted on the extruded, green fibers, e.g., gravity, drawing, or air streams, cause attenuation or stretching of the fibers, reducing their diameter by about 50 to 90 percent or more and increasing their length by about 300 to 10,000 percent or more and serving to hasten or aid the drying of the green fibers.

The dehydrative gelling of the green fibers can be carried out in ambient air, or heated air can be used if desirable or necessary to obtain fast drying. The drying rate assists in controlling of the shape of the fiber. The relative humidity of such air should be controlled since large amounts of moisture will cause the gelled or shaped green fibers to stick together, and excessively dry atmosphere can lead to fiber breakage. Generally, air with relative humidity in the range of 20 to 60 percent can be used, at temperatures of 15° to 30° C., though such air can be heated subsequently to about 70° C. or higher. In some cases, for example, where continuous green fibers are made and gathered together in parallel alignment or juxtaposition in the form of a multi-fiber strand, the fibers or strand can be treated with a size to prevent the fibers from sticking together.

Further detail in fiberizing the viscous concentrate will be omitted here in the interest of brevity since such procedures are now known, e.g., see said U.S. Pat. No. 3,760,049.

The bicomponent fibers in their green or unfired gel form generally comprise about 25 to 60 weight percent equivalent oxide, nitride, or carbide solids (as determined by calcining a sample) and are dry in the sense that they do not adhere or stick to one another or other substrates and feel dry to the touch. But the "dry" fibers still contain substantial amounts of water, organic, and other fugitive material, e.g., 40 to 75 weight percent altogether, and it is necessary to calcine or fire the green fibers in order to remove further water and organic material and convert the fibers into refractory fibers. The term "dehydrative gelling" (or "evaporative gelling"), as used herein, therefore does not mean that all the water in the green fibers is removed. Thus, in a sense, this step can be called partial dehydrative gelling. It may be noted at this point that the green fibers are transparent and clear under an optical microscope and, unless coloring additives are included in the viscous concentrate, they appear to look like colorless glass fiber. The green fibers are relatively strong enough for further processing and can be collected and fired without significant breakage.

In order to remove the balance of water and organic material from the green bicomponent fibers and convert them to refractory fibers, they are calcined in a furnace or kiln (preferably an electric resistance furnace), this heating being carried out usually in air or other oxidizing atmosphere at temperatures below the fusion or melting point of the ceramic mixture and usually up to about 800°–1000° C., or in certain cases [e.g., alumina-silica (mullite)] up to 1400° C. Calcination can be accomplished in a number of ways, for example by heating in a single step from a low or room temperature to a desired elevated temperature (e.g., from room temperature to 1000° C. in 20-60 minutes or more) or by heating in a series of steps at progressively higher temperatures, with or without cooling or storage between steps.

The green bicomponent fibers can be calcined in a batch or continuous manner in an oriented form, such as strands or continous yarn (a plurality of untwisted or slightly twisted parallel-aligned, virtually endless, continuous fibers) or hanks (continuous fibers or strands in coiled form), or tows (group of continuous fibers without definite twist and collected in loose form) or calcined in an irregular or random order, such as a mat of intermeshed, mechanically interlocked or tangled fibers, or calcined in the form of staple fiber.

In firing the green fibers, care should be exercised to avoid ignition of combustible material in or evolved from the fibers, for example, by controlling the firing atmosphere or by starting out at a low temperature, e.g., room temperature, and then elevating the temperature at a slow rate, since such ignition may cause the formation of opaque, fragile fibers. If the green fibers are not to be fired completely in one operation or are not to be fired immediately or soon after their formation, it may be desirable or necessary to store the green fibers in a relatively dry or protective atmosphere to prevent them from picking up moisture or contaminants and deteriorating or sticking together.

The green fibers in their continuous form may be gathered or collected in the form of a strand, the strand then accumulated in a relaxed, loose, unrestrained configuration of offset or superimposed loops (as in a "figure 8") on a substrate and calcined in that configuration. In certain cases it may be desirable to pull the strand in a straight or linear form through a furnace to produce essentially straightened refractory strands, a plurality of which can be formed into continuous yarn, all in the continuous manner described in said U.S. Pat. No. 3,760,049.

The calcining step volatilizes the balance of the water, decomposes and volatilizes organic material, and burns off carbon, the resultant refractory being an essentially carbon-free ceramic refractory. This calcining heating step also causes some shrinkage which is generally about 50 percent or more. Shrinkage of one component to a greater extent than the other results in crimping. However, the shape of the fibers during firing when so fired are still of essentially continuous length even though they have a high degree of crimp and loft.

The refractory material resulting from firing the green fibers at about 900° to 1000° C. comprises crystalline material discernible by x-ray powder diffraction.

The refractory bicomponent fibers of this invention are transparent, glossy, smooth, dense, round, stable, inert, colorless (unless colorant metal oxide additives are incorporated in the fiber precursor liquid). They can have relatively low weight loss (e.g., less than about 2 weight percent) and shrinkage (e.g., less than 2.5 linear percent) when heated or used up to 1100°, and some fibers such as alumina-silica, to 1400° C. They have useful strength, high resistance to fracturing, and are flexible, and can be handled without essentially any breakage. By flexible is meant the continuous fibers can be bent by hand around a rod, e.g., with a diameter of 1.5 mm or a radius or curvature of 0.75 mm, without breaking. The properties of the bicomponent fibers are generally weighted averages of the components.

In the shaped, fired, refractory bicomponent fibers of the present invention each component has at least one microcrystalline phase or can be amorphous and convertible to at least one microcrystalline phase on further firing. The component fibers of this invention may also be polycrystalline and contain amorphous species. The fibers of this invention which have diameters in the range of about 1 to 50 micrometers, preferably 5 to 20 micrometers, and for high loft insulation applications preferably 1 to 5 micrometers, have properties which enable their use in many environments. These fibers may be exposed to high temperatures (e.g., 1000° C. and in certain cases 1400° C. depending upon composition) and may remain strong, flexible and continuous.

The fired fibers are continuous, uniformly round or oval, rod-like (elongated ovoid), or ribbon-like, strong, flexible, smooth, glossy, refractory, polycrystalline, or amorphous fibers. The fibers are useful in making refractory textile fabric or as fillers or reinforcement for plastic composites.

As mentioned above, to spin the bicomponent fibers of the invention requires the rheological properties of each precursor liquid be sufficiently close to ensure the proper laminar flow into the spinerette orifice to form the fiber. Additionally, the solvents (i.e., (1) water or water miscible or (2) nonpolar organic solvents such as benzene, dioxane, diethylether, toluene, ethyl n-propyl ether, ethyl isopropyl ether, tetrahydrofuran, and xylene, or a mixture thereof) and other sol components require a degree of compatability to ensure the formation of a good adhesion interface between the two fiber components.

Figure 2:
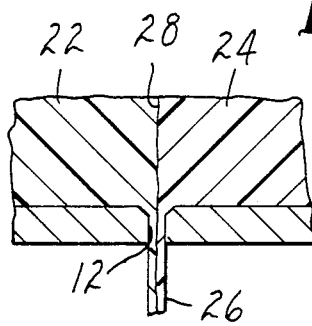
FIG. 2 shows an enlarged fragmentary sectional view taken along the line 2—2 of FIG. 1.

In one embodiment, as shown in FIGS. 1 and 2, the apparatus 10 and procedure to make bicomponent fibers 26 of the invention used a single line of spinnerette holes 12, 152 or 76 micrometer (6 or 3 mil) in diameter and twenty in number. Two precursor spinning liquids 22 and 24 were adjusted to about the same viscosity, for example, 50,000 cps. The preferred viscosity was about 50,000 to 100,000 cps. The spinning precursor liquids 22 and 24 were then placed in the spinnerette cup 14. The interface line 28 between the two liquids occurred at the centerline of the spinnerette orifices 12. Precursor liquids 22 and 24 meet at interface line 28 but do not mix because of their high viscosities. Because the viscosities of liquids 22 and 24 were essentially the same and the flow was laminar, the two liquids 22 and 24 arrived at and passed through orifice 12 at the same flow rate (see FIG. 2). Fiber 26 was collected and fired in an air atmosphere furnace from room temperature to about 800° to 1,000° C. to produce a refractory fired fiber.

Bicomponent fibers are highly desirable for many uses because such fibers can be made to be self-crimping and provide woven and nonwoven fabrics or webs of desirable bulk. These properties and others result from the different physical properties of the two spinning precursor systems which have good adhesion to one another as spun. The fibers are particularly useful for high temperature, stable, high loft insulation, as catalyst supports, as an open substrate to be infiltrated by resins, glasses, or metals, or mixed with ceramics in a composite.

With the bicomponent spinning die a new dimension of ceramic fibers is available. A wide variety of fiber combinations are available since the sols are fed as independent streams to the feed cavity and the orifice. The first stream can comprise a single metal oxide sol, a blend of two or more major component sols, or any combination of minor additives to provide, for example, color. In the same manner, the second stream can comprise any of the same combinations. A wide range of combinations are available to impart a wide range of properties to meet specialty needs of ceramic fibers. For example, a blend of high modulus with lower modulus base sol provides a bicomponent fiber with reduced friability; that is, the fiber can withstand the flex and bends of textile weaving yet provide a higher strength fabric. Bicolor fibers can be provided for applications requiring color coding.

Ceramic fibers which are magnetic or attractive to a magnet are highly desirable, for example, as magnetic filter media to remove iron particulate contaminants in high purity ceramic slurries. High surface area, low pressure-drop fiber catalyst systems are highly desirable, for example, as catalytic distillation sections in distillation columns. When sols of these catalytic and magnetic type materials are spun into fibers, they are often too weak and friable to be converted into useful forms. The bicomponent fiber provides an unusual opportunity to develop these fiber product systems. Strong fibers, e.g., alumina-boria-silica 3-1-2 or alumina-silica (mullite) fibers provide a good carrier for the low strength magnetic fibers (e.g., barium titanate), cyatalytic fibers (e.g., platinum cermet), non-magnetic fibers (e.g., tungsten cermet), or magnetic attractive fibers (e.g., nickel).

Objects and advantages of this invention are further illustrated by the following examples, but the particular materials and amounts thereof recited in these examples, as well as other conditions and details, should not be construed to unduly limit this invention.

EXAMPLES 1-7

The general method for obtaining bicomponent fibers of various components is illustrated as follows:

A sol consisting of 200 g basic aluminum acetate in 400 mL water and 86 g aqueous colloidal silica dispersion resulting in an oxide equivalent of $3Al_2O_3.1B_2O_3.2SiO_2$ was cospun with a like sol containing 1 weight percent $Fe_2O_3$ to provide a color source as an aid to identify the dual composition fiber. The two sols were placed in a spinnerette cup having 127 micrometer (5 mil) orifices arranged in a straight line. Each spinning sol was placed on opposite sides of the orifice line in the spinnerette cup. The spinnerette unit was assembled and nitrogen gas pressure at 14.7 kPa (100 psi) was applied. The formed fibers were collected on a wood stick at the bottom of the spinning tower which was equipped with heat lamps to dry the falling fibers.

The collected fibers were fired from room temperature (RT) to 800° C. in about two hours. The fibers were then observed under a microscope showing a single fiber, part white and part black as shown in the black and white photo, FIG. 5. Because the spinning sols were essentially of the same composition, there was virtually no crimping.

Examples of bicomponent fibers that were made using the method of this invention are shown in TABLE I below:

TABLE I

| Ex. | Components* A | B | Orifice size-micrometer | Fiber comments** |
|---|---|---|---|---|
| 1 | A-B-S 3-1-2 | A-B-S 3-1-2 + 1% $Fe_2O_3$ | 127 | rust brown no crimp |
| 2 | A-B-S 3-1-2 | A-S + 2% $B_2O_3$ + 1$Cr_2O_3$ | 152 | light green high crimp |
| 3 | A-S + 2% $B_2O_3$ 1% $Cr_2O_3$ | A-S + 2% $B_2O_3$ + 1% CuO | 152 | light green light crimp |
| 4 | Zr-S | A-B-S 3-1-2 | 76 | white light crimp |
| 5 | A-S + 2% $B_2O_3$ + 20% $Fe_2O_3$ | A-S + A-B-S 3-1-12 | 152 | rust brown very tight crimp |
| 6 | A-B-S 3-1-2 | A-S + $Cr_2O_3$ A-B-S 3-1-12 | 76 | light green high crimp |

TABLE I-continued

| Ex. | Components* A | B | Orifice size-micrometer | Fiber comments** |
|---|---|---|---|---|
| 7 | A-S + 2% $B_2O_3$ + 1% CoO | A-S + 2% $B_2O_3$ | 152 | light blue |

*A-B-S 3-1-2 alumina-boria-silica 3:1:2 (molar ratio)
A-B-S 3-1-12 alumina-boria-silica 3:1:12 (molar ratio)
A-S alumina-silica (mullite) 3:2 (molar ratio)
Zr-S zirconia-silica 1:1 (molar ratio)
**Crimping is caused by differences in shrinkage between the two components during drying and/or firing processes.

EXAMPLE 8

An $Al_2O_3$ sol was co-spun with a 50:50 $Al_2O_3$-$ZrO_2$ sol. The alumina sol was prepared by adding 68 g lactic acid to 1100 g aluminum formoacetate and concentrating the sol to the spinning sol viscosity. The 1:1 $Al_2O_3$:$ZrO_2$ sol was prepared by mixing 492 g zirconium acetate into 1122 g aluminum formoacetate with a further addition of 70 g lactic acid. The sol precursor was concentrated to the spinning viscosity. The fibers were fired to 700° C. and held for 0.5 hour. As observed in an optical microscope, bicomponent fibers were formed; the shrinkage was minimal and low crimping was seen.

EXAMPLE 9

Basic Sol with Additives as One Component Fiber

A sol consisting of 70% by weight A-B-S 3-1-2 and 30% by weight Ni was prepared as follows (about 8.5 weight percent oxides)

100 g BAA (basic aluminum acetate, 7 weight percent $3Al_2O_3$:$1B_2O_3$ oxide equivalent based on drying and calcination to the oxide state)
3.0 g lactic acid (85% by weight)
6.8 g silica sol, (Nalco 1034-A TM, Nalco Chemical Co., Chicago, Ill.)
3.0 g dimethyl formamide were mixed together to form the basic A-B-S 312 sol. To this mixture was added 17.34 grams of nickel acetate.4 $H_2O$ which was dissolved in 50 ml water.

The total mixture was filtered through a 0.3 micrometer Balston TM filter tube (Balston, Inc., Lexington, Mass.) cartridge filter, then concentrated in a Rotavapor TM -R rotating evacuated flask (Buchi, Switzerland) to a viscous sol of about 50,000 centipoise. This sol was readily spun using 29.4 kPa (200 psi) $N_2$ pressure and a 30 hole, 76 micrometer (3 mil) spinnerette. The fiber was light green in color. This sol was co-spun with A-B-S 3-1-2 which when heated in a hydrogen atmosphere resulted in a fiber which was attractive to a magnet.

EXAMPLE 10

Bicomponent Fibers of A-B-S 312/A-B-S 312+30% $Fe_2O_3$ 1. 541.2 g of a 7 percent aqueous solution of basic aluminum acetate (BAA), where 7% means oxide equivalent based on calcining of dried material which will have a ratio or 3 mole alumina to 1 mole boria
2. 15.0 g of 85 weight percent lactic acid
3. 35.7 g silica sol (Nalco TM 1034A, Nalco Chemical Co., Oak Brook, Ill.)
4. 14.5 g dimethylformamide (DMF)

The mixture was prepared by mixing the above materials in the order (1+2+3+4). The resulting mixture was filtered through a 0.3 Balston TM cartridge (Balston, Inc., Lexington, Mass.) and 1 Millipore TM filters into a round bottomed flask to be concentrated in a Rotavapor-R (water bath was 32°-35° C.) to a viscous sol of about 86,000 centipoise viscosity.
(Note: only half amount of the above mixture was concentrated).

The other half of the mixture (equivalent to 25 g oxide content) was stirred into 500 g of iron acetate sol (1.5% $Fe_2O_3$); the resulting mixture was then filtered through 0.3 and 1 micrometer filters to another round flask to be concentrated in a Rotavapor-R to a viscous sol of about 97,000 cps viscosity. Both viscous sols were then filled into a 101 micrometer (4 mil)×20 hole spinnerette. The holes were in a row at the center of the spinnerette. A thin glass baffle (with a small space above the holes) was used as the boundary of both sols. Both sols were spun into fibers 29.4 kPa (200 psi lbs. pressure) which were fired:

In air, from room temperature to 850° C. in 3 hrs. and soaked at 850° C. for ½ hr. The fiber showed no magnetic properties.

In 100% $H_2$ atmosphere: half of the air fired fibers above was fired from room temperature to 900° C. in 45 minutes, soaked at 900° C. for ½ hr. then cooled to room temperature. The fiber had magnetic properties, that is, was attracted to a permanent magnet.

Figure 4:
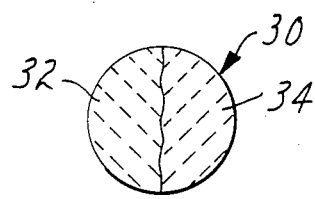
FIG. 4 is an enlarged sectional view taken along line 4—4 of FIG. 3 and rotated 90°.
Figure 3:
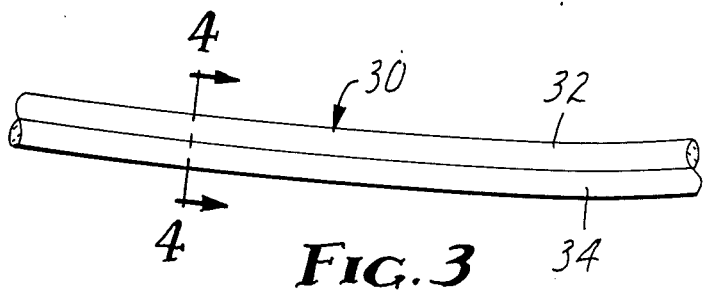
FIG. 3 is an elevational view of a bicomponent fiber.
Figure 5:
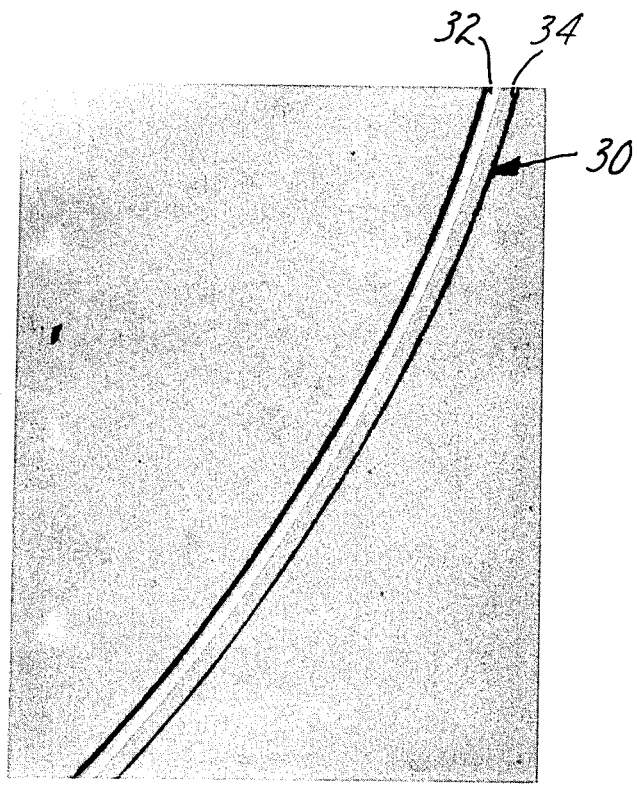
FIG. 5 is a photomicrograph showing refractory bicomponent fibers of the invention, fired at 850° C. and enlarged 100 times.

FIGS. 3, 4, and 5 show an air dried and hydrogen fired bicomponent fiber 30, with component fibers 32 and 34 being in laminated longitudinally extended configuration.

EXAMPLES 11 AND 12

A magnetic bicomponent fiber was prepared by co-spinning an A-B-S 3-1-2 sol with a barium titanate precursor sol. The barium titanate precursor sol was prepared from a water solution of barium acetate plus anhydrous ferrous acetate in a mole ratio of 1Ba:12Fe.

A second bicomponent fiber was prepared as described immediately above except that instead of ferrous acetate, $FeCl_3.6H_2O$ was precipitated with $NH_4OH$ in an aqueous solution.

To aid in fiberization, a small amount of polyvinylpyrrolidone (PYP-K30 TM, GAF), dissolved in water, was stirred into each of the two sols described above. Upon concentration, the sols became viscous and tacky. Continuous bicomponent fibers were spun from these concentrates and A-B-S 3-1-2. These bicomponent fibers were magentic.

High loft webs of these fibers can be used to remove iron contaminants from a ceramic slurry.

Various modifications and alterations of this invention will become apparent to those skilled in the art without departing from the scope and spirit of this invention, and it should be understood that this invention is not to be unduly limited to the illustrative embodiments set forth herein.

I claim:

1. A continuous, bicomponent, non-vitreous ceramic fiber which is circular, oval, or rod-like in cross-section comprising two ceramic components in a longitudinally-extending side-by-side relationship wherein each of the components is derived from a different compatible fiber-forming aqueous-based ceramic precursor liquid, and wherein said components are independently selected from the group consisting of titania, alumina-chromia metal (IV) oxide, alumina-silica, thoria-silica metal (III) oxide, alumina-boria, alumina-boria-silica, zirconia-silica, and combinations thereof.

2. The fiber according to claim 1 wherein each of the components provide different ceramic compositions.

3. The fiber according to claim 1 which is unfired.

4. The fiber according to claim 1 which is fired.

5. A continuous, bicomponent, non-vitreous ceramic fiber which is circular, oval, or rod-like in cross-section comprising two ceramic components in a longitudinlly-extending side-by-side relationship wherein each of the components is derived from a different compatible fiber-forming aqueous-based ceramic precursor liquid, and wherein said components are independently selected from the group consisting of titania, alumina-chromia metal (IV) oxide, alumina-silica, thoria-silica metal (III) oxide, alumina-boria, alumina-boria-silica, zirconia-silica, and combinations thereof, and at least one of said ceramic components also contains 0.05 to 25 weight percent based on the total weight of the component in the fiber of at least one other water-soluble metal compound calcinable to metal oxide.

6. A continuous, bicomponent, non-vitreous ceramic fiber which is circular, oval, or rod-like in cross-section comprising two ceramic components in a longitudinally-extending side-by-side relationship wherein each of the components is derived from a different compatible fiber-forming aqueous-based ceramic precursor liquid, and wherein said components are independently selected from the group consisting of titania, alumina-chromia metal (IV) oxide, alumina-silica, thoria-silica metal (III) oxide, alumina-boria, alumina-boria-silica, zirconia-silica, and combinations thereof, and each of said ceramic components also contains 0.05 to 25 weight percent based on the total weight of the component in the fiber of at least one additional water-soluble metal compound calcinable to metal oxide.

7. The fiber according to claim 1 wherein said components are present in a volume ratio range of 50:50 to 10:90.

8. The fiber according to claim 1 wherein said components are present in a volume range ratio of 40:60 to 60:40.

9. The fiber according to claim 1 which is crimped.

10. The fiber according to claim 5 which is a mono- or bicolor filament.

11. The fiber according to claim 6 which is a bicolor filament.

12. The fiber according to claim 1 which is magnetic.

13. The fiber according to claim 1 which is attractive to a magnet.

14. A continuous, bicomponent, non-vitreous ceramic fiber which is circular, oval, or rod-like in cross-section comprising two ceramic components in a longitudinally-extending side-by-side relationship wherein each of the components is derived from a different compatible fiber-forming aqueous-based ceramic precursor liquid, and wherein said components are independently selected from the group consisting of titania, alumina-chromia metal (IV) oxide, alumina-silica, thoria-silica metal (III) oxide, alumina-boria, alumina-boria-silica, zirconia-silica, and combinations thereof, and both of said ceramic components also contain reducible metal oxides, which fiber is convertible to a cermet/cermet fiber when fired in a reducing atmosphere.

15. A yarn comprising the fiber according to claim 1.

16. A woven fabric comprising the fiber according to claim 1.

17. A nonwoven web comprising the fiber according to claim 1.

18. The nonwoven web according to claim 17 useful in catalytic distillation processes.

19. A mat comprising the crimped fiber according to claim 9.

* * * * *